June 4, 1935. A. THOMAS 2,003,402

BORING TOOL

Filed Jan. 24, 1933  2 Sheets-Sheet 1

Albert Thomas INVENTOR

BY Victor J. Evans & Co.

ATTORNEYS

June 4, 1935.　　　　　A. THOMAS　　　　　2,003,402
BORING TOOL
Filed Jan. 24, 1933　　　2 Sheets-Sheet 2
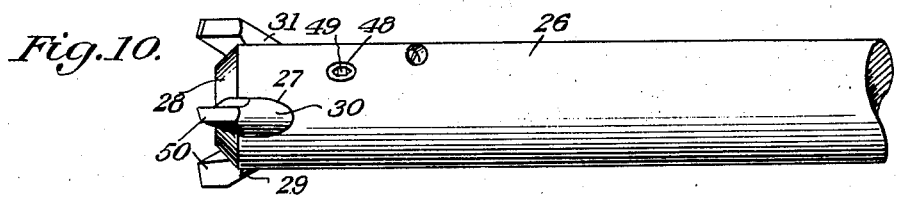
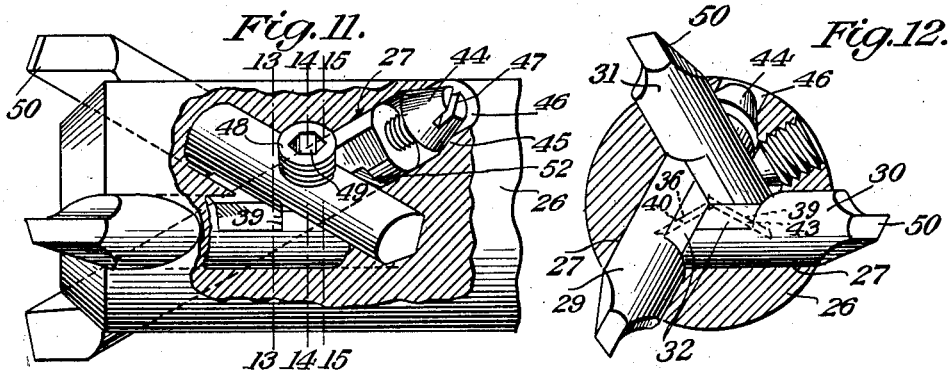
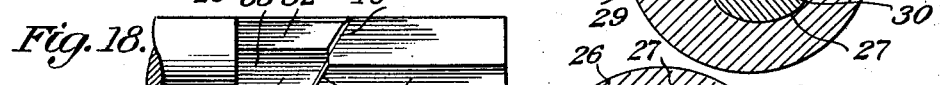
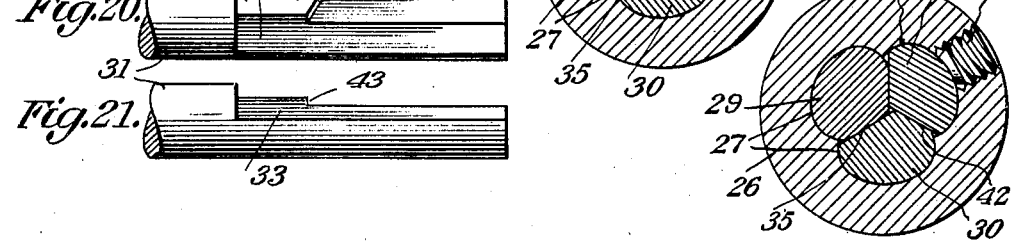
Albert Thomas
INVENTOR
BY Victor J. Evans & Co.
ATTORNEYS Patented June 4, 1935

2,003,402

UNITED STATES PATENT OFFICE 2,003,402

BORING TOOL

Albert Thomas, Homestead Park, Pa.

Application January 24, 1933, Serial No. 653,323

7 Claims. (Cl. 77—58)

The invention relates to a boring tool and more especially to a self-centering and adjustable boring tool.

The primary object of the invention is the provision of a tool of this character, wherein two or more cutters are so mounted in the head of the tool as to be disposed at an angle to the longitudinal axis of such head and the same adjustable to vary the cutting action of the tool, the assembly of the cutters being novel to assure maximum strength to the tool as the head will be devoid of weakened areas.

Another object of the invention is the provision of a tool of this character, wherein a jumping action in the operation thereof is eliminated and quick cutting action assured.

A further object of the invention is the provision of a tool of this character, wherein the particular mounting of the cutters in the head eliminates the collecting of cuttings and dust during the working of the tool within its head, the cutters in their mounting in the head being susceptible of maximum adjustment and in this fashion eliminating the necessity of a large number of cutters to govern a given variation in diameter and at the same time assuring rigidity to the cutters and strength to the head, the adjustment of the cutters being had in a convenient manner and with dispatch, the tool being of a self-centering type.

A further object of the invention is the provision of a tool of this character which is extremely simple in construction, thoroughly reliable and efficient in its operation, durable, readily and easily adjusted, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 10 is a view similar to Figure 1 showing a slight modification.

Figure 11 is an enlarged elevation partly broken away.

Figure 12 is a tranverse sectional view thereof.

Figure 13 is a sectional view on the line 13—13 of Figure 11.

Figure 14 is a sectional view on the line 14—14 of Figure 11.

Figure 15 is a sectional view on the line 15—15 of Figure 11.

Figure 16 is a fragmentary elevation of one of the cutters of the modified form of tool.

Figure 17 is a side view thereof.

Figure 18 is an elevation of another of the cutters of the modified form of tool.

Figure 19 is a side view thereof.

Figure 20 is an elevation of still another of the cutters of the modified form of tool.

Figure 21 is a side elevation thereof.

Similar reference characters indicate corresponding parts throughout the several views in the drawings.

Figure 1:
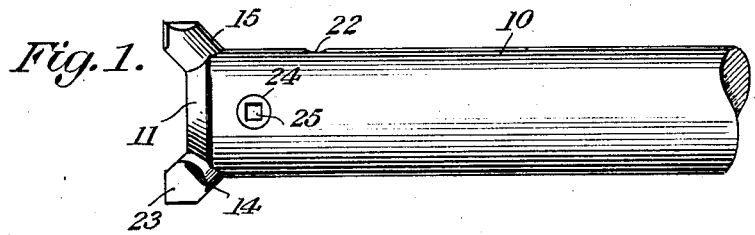
Figure 1 is a fragmentary side elevation of a boring tool constructed in accordance with the invention.
Figure 2:
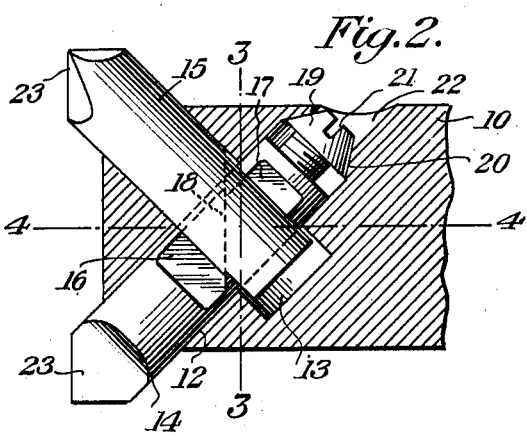
Figure 2 is an enlarged vertical longitudinal sectional view thereof.
Figure 3:
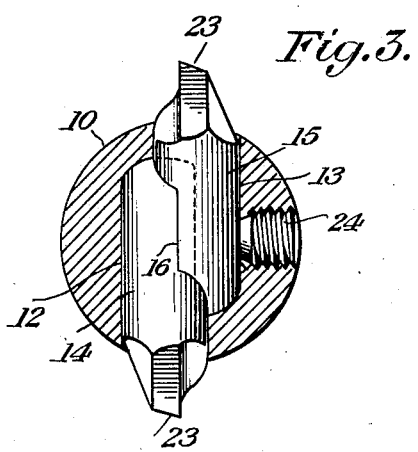
Figure 3 is a transverse sectional view taken on the line 3—3 of Figure 2.
Figure 4:
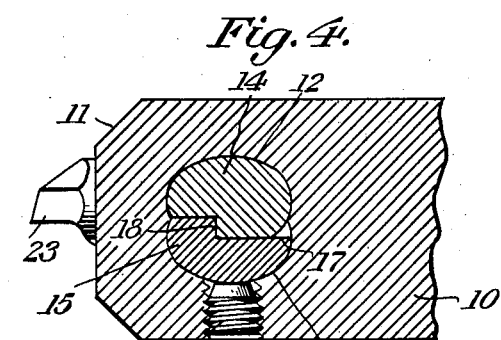
Figure 4 is a sectional view on the line 4—4 of Figure 2 looking in the direction of the arrows.
Figure 5:
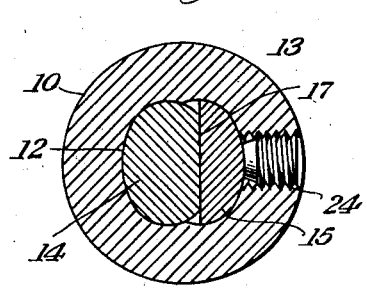
Figure 5 is a further transverse sectional view through the tool.
Figure 6:
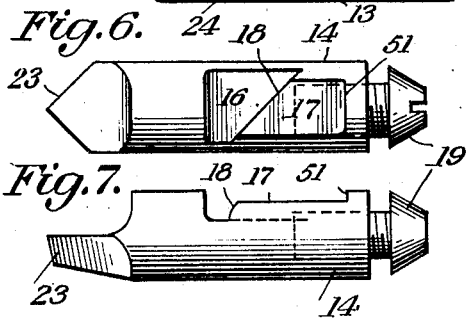
Figure 6 is an elevation of one of the cutters.
Figure 7:
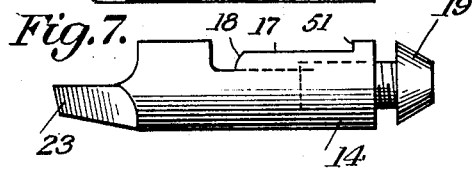
Figure 7 is a side view thereof.
Figure 8:
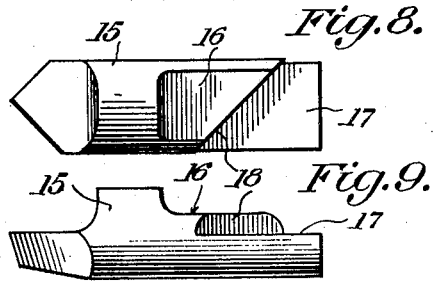
Figure 8 is an elevation of another of the cutters.
Figure 9:
Figure 9 is a side view thereof.

Referring to the drawings, particularly Figures 1 to 9 inclusive, disclosing an embodiment of the invention relating to the boring tool which comprises a head 10 in the form of a solid circular bar. This bar has a beveled edged end 11, while intersecting this beveled edged end are crossed diagonally disposed bores or sockets 12 and 13 respectively, these being arranged in close side by side relation and communicative with each other.

The bores 12 and 13 receive therein the cutters 14 and 15 respectively which are provided with plane surfaces or flats 16 and 17 and a shoulder or step 18 between said flats, the step being diagonally disposed relative to the flats and the step of the cutter 14 being reversely extended with relation to the step of the cutter 15 so that these steps of both cutters will abut each other. Due to the angular disposition of the cutters 14 and 15 in the head or bar 10 the steps 18 thereof in their abutting relation to each other will be transversely of the longitudinal axis of said head or bar. The flats 16 and 17 with the steps 18 permit a close interfitting of these cutters for a purpose presently described.

The cutter 14 at its inner end has threaded therein an adjusting screw 19 which plays against a seat 20 formed at the inner end of the bore or socket 12, the screw 19 being preferably formed with a screw driver kerf or groove 21 accessible through an opening 22 in the head or bar 10 at one side thereof. Thus in the use of a screw driver, by engaging the same in the kerf or groove 21, the screw 19 can be adjusted and under its adjustment the cutters 14 and 15 will be simultaneously shifted in the sockets 12 and 13 for a given range of adjustment of said cutters.

The cutters 14 and 15 at their outer ends are formed with cutting tips 23.

Fitted in the head or bar 10 to confront the cutter 15 is a binding screw 24, the same having a countersunk wrench engaging socket 25 so that the same can be turned for securing the cutters 14 and 15 in their adjusted position, it being understood of course that the screw 24 is loosened when it is desired to make adjustment of the cutters as will be apparent.

In Figures 10 to 21 of the drawings there is shown a modification of the invention, wherein the head or bar 26 has formed therein the angular sockets or bores 27, there being three in number, these intersecting each other and the beveled edged end 28 of the head or bar 26, the outer ends of said bores or sockets 27 being equidistant from each other for a uniformity of distribution of the cutters 29, 30 and 31 respectively, received in said bores or sockets.

The cutters 29, 30 and 31 are formed with the angular faces 32 and 33 respectively, while the cutter 29 at the angular face 33 has formed the plane surfaces or flats 34 and 35 and shoulder or step 36 respectively. The cutter 30 has at the faces 32 and 33 the flats 37 and 38 and steps 39 and 40 respectively. The cutter 31 at the face 32 has the flats 41 and 42 and step 43. These flats and steps of the respective cutters 29, 30 and 31 permit the interfitting of said cutters when received in the sockets or bores 27 in the head or bar 26, while the steps 36, 39, 40 and 43 contact with each other so that on adjustment of the cutter 29 a corresponding adjustment will be had of the cutters 30 and 31. The cutter 29 at its inner end has threaded therein an adjusting screw 44 which plays against a seat 45, the screw 44 being accessible through an opening 46 in the head or bar 26 and is provided with a screw driver slit or groove 47 accessible through the opening 46 so that in the use of a screw driver the cutter 29 may be adjusted and simultaneously therewith the cutters 30 and 31.

Threaded in the head or bar 26 is a binding or set screw 48 having a countersunk wrench receiving socket 49 and this screw is for service in securing the cutters 29, 30 and 31 in their adjusted position identically with the service of the screw 24.

The cutters 29, 30 and 31 at their outer ends are formed with cutting tips 50.

The assembly of the cutters 29, 30 and 31 with the head or bar 26 is clearly apparent from Figures 11 to 15 inclusive of the drawings.

It should be apparent that by the disposition of the seat 20 or 45 for the adjusting screw there is no possibility of the collecting of cuttings or dust during the operation of the tool in the head or bar 26. Furthermore, the assembly of the cutters in both the preferred and modified forms of the invention avoids any possibility of a weakened point in the tool, that is, in the head or bar 26. Furthermore, the adjusting screw 19 or 44 works outwardly against the seat 20 or 45, thus maintaining the opening 22 or 46 closed under the expansion of the cutter or the retracting of the same. It should be apparent that when the screw 19 or 44 is worked outwardly of the cutter the tool is expanded and on the working of such screw inwardly the cutters are receded for the retracting of such tool.

The binding screws 24 and 48 are set in the bars 10 and 26 respectively, so as to attack the cutters at their crossing points with relation to each other and in this fashion a single binding screw only is necessary for the securing of the tool in adjusted condition.

The cutter 14 has thereon a stop shoulder 51 and likewise the cutter 29 has the stop shoulder 52 which serves in both instances to contact with the next adjacent cutter of the series so as to act as a stop to limit the adjustment of the cutters when expanded to the maximum.

The tips 23 of the cutters 14 and 15 are in an advantageous position owing to the centers of the sockets 12 and 13 therefor in the bar 10 and these being at opposite sides of the center of said bar. This is equally true with respect to the three cutter bar. The angular disposition of the cutters 14 and 15 reduces the friction of cuttings binding against side of hole being bored, giving cuttings more room to escape and thus reduces or minimizes the tendency of the cuttings to wedge into the angle. In this it will eliminate the trouble of cuttings pushing bar over out of position and thus renders the tool steadier and more even of operation.

It will be apparent that the cutters in the bar 10 or 26 under the assembly of such have the said cutters interfitted and crossing each other and the expansion or adjustment of the tool can be had with dispatch and accuracy. The interfitting or interlocking of the cutters prevents turning of such cutters or the rocking of the same on their axes.

What is claimed is:

1. A boring bar of the character described comprising a body, intersecting cutters carried by the body and having cooperating motion transmitting means for coextensive adjustment of the cutters diagonally with respect to the body, a set screw carried by the body and engaged with the cutters at their intersecting point to lock the cutters in adjusted position, an adjusting screw threaded in one cutter and seated in the body, the cooperating motion transmitting means for coextensive diagonal adjustment of the cutters constituting the sole means for transmitting adjustment of said screw to another cutter, and means on one of the cutters to abut a portion of an adjacent cutter to limit the adjustment of the cutters of said bar to a maximum.

2. A boring bar comprising a head, a plurality of cutters disposed therein and arranged to effect a three or more point support of said bar in operation, said cutters being arranged to intersect and engage in substantially a common plane, and means lying substantially in said plane for locking said cutters.

3. A boring bar comprising a head, a plurality of cutters disposed therein and spaced circumferentially therein approximately 120° apart, and arranged to intersect and engage in substantially a common plane, means for adjusting said cutters, and means lying substantially in said plane for locking said cutters.

4. A boring bar comprising a head with a plurality of sockets therein, three or more cutter bars mounted in said sockets and arranged to intersect in a substantially common plane, said cutter bars being formed at the intersection with a plurality of cooperating plane surfaces to mutually transmit movement from one to another, means associated with one of said cutter bars for varying the effective length of said bar and means in the corresponding socket for engaging said latter means whereby adjustment of said cutter bars relative to said boring bar may be effected.

5. A boring bar comprising a head, a plurality of cutters disposed therein and arranged to effect a three or more point support of said bar in operation, said cutters being arranged to intersect and engage in substantially a common plane, means for adjusting said cutters comprising means associated with one of said cutters and arranged to cooperate with a portion of said bar to effect adjustment of said cutter, said cutter being formed with a plurality of plane surfaces adjacent its intersection with the remaining cutters to engage a plurality of parallel plane surfaces on said remaining cutters, and shoulders formed to diagonally interrupt said plane surfaces and arranged so that movement of said first cutter will effect substantially like movement of said remaining cutters, and means to lock said cutters in any position of adjustment.

6. A boring bar comprising a head, a plurality of cutters disposed therein and spaced circumferentially therein approximately 120° apart, and arranged to intersect and engage in substantially a common plane, means for adjusting said cutter comprising means associated with one of said cutters for varying the effective length of said cutter and means on said bar for engaging said latter means to effect adjustment of said cutter relative to said boring bar, said cutter being formed with a plurality of plane surfaces adjacent its intersection with the remaining cutters to engage a plurality of parallel plane surfaces on said remaining cutters, said plane surfaces being diagonally interrupted by shoulders arranged to transmit movement of said first cutter to said remaining cutters, and a shoulder on one of said cutters to limit the maximum adjustment of said cutters.

7. A boring bar comprising a head with a plurality of sockets therein, three or more cutter bars mounted in said sockets and arranged to intersect, means for adjusting said cutter bars comprising means associated with one of said cutter bars for varying the effective length of said bar, means in the corresponding socket for engaging said latter means to effect an adjustment of said cutter bar relative to said boring bar, said cutter bar being formed with a plurality of plane surfaces adjacent its intersection with the remaining cutters to engage a plurality of parallel plane surfaces on said remaining cutters, said plane surfaces being diagonally interrupted by shoulders arranged to transmit movement of said first cutter to said remaining cutters, a shoulder on one of said cutter bars arranged to engage an adjacent cutter bar to limit the outer limit of adjustment of said cutter bars, and means to lock said cutter bars in any position of adjustment, said latter means comprising a pressure member arranged to force one of said cutter bars against the remaining cutter bars under relatively high pressure.

ALBERT THOMAS.